US009668504B2

(12) United States Patent
Baniel

(10) Patent No.: US 9,668,504 B2
(45) Date of Patent: *Jun. 6, 2017

(54) SWEETENER COMPOSITIONS

(71) Applicant: DouxMatok Ltd., Tel-Aviv (IL)

(72) Inventor: Avraham Baniel, Jerusalem (IL)

(73) Assignee: DouxMatok Ltd, Tel-Aviv (IL)

( * ) Notice: Subject to any disclaimer, the term of this patent is extended or adjusted under 35 U.S.C. 154(b) by 150 days.

This patent is subject to a terminal disclaimer.

(21) Appl. No.: 14/528,750

(22) Filed: Oct. 30, 2014

(65) Prior Publication Data

US 2015/0150292 A1  Jun. 4, 2015

Related U.S. Application Data

(63) Continuation of application No. 11/995,464, filed as application No. PCT/IL2006/000573 on May 16, 2006, now Pat. No. 8,911,806.

(30) Foreign Application Priority Data

Jul. 14, 2005  (IL) ................ 20050169678

(51) Int. Cl.
A23L 1/22 (2006.01)
A23L 27/30 (2016.01)
A23L 27/00 (2016.01)

(52) U.S. Cl.
CPC ........... *A23L 1/22041* (2013.01); *A23L 27/33* (2016.08); *A23L 27/70* (2016.08); *A23L 27/77* (2016.08); *A23L 27/79* (2016.08); *A23L 27/72* (2016.08); *A23V 2002/00* (2013.01); *A23V 2200/15* (2013.01); *A23V 2200/16* (2013.01); *A23V 2200/22* (2013.01); *A23V 2200/25* (2013.01); *A23V 2200/254* (2013.01); *A23V 2250/60* (2013.01); *A23V 2250/61* (2013.01); *A23V 2250/628* (2013.01)

(58) Field of Classification Search
CPC ...... A23L 1/22008; A23L 27/33; A23L 27/70; A23L 27/72; A23L 27/77; A23L 27/79; A23V 2250/628; A23V 2250/60; A23V 2200/15; A23V 2200/16; A23V 2002/00; A23V 2200/22; A23V 2200/25; A23V 2200/254; A23V 2250/61
USPC ...................... 426/96, 97; 127/30, 34, 36, 63
See application file for complete search history.

(56) References Cited

U.S. PATENT DOCUMENTS

| | | | |
|---|---|---|---|
| 3,175,299 A | 3/1965 | Boucher | |
| 3,503,803 A | 3/1970 | Richard et al. | |
| 4,343,820 A | 8/1982 | Roseman | |
| 4,513,012 A | 4/1985 | Carroll et al. | |
| 4,626,287 A | 12/1986 | Shah et al. | |
| 4,659,388 A | 4/1987 | Innami et al. | |
| 4,671,823 A | 6/1987 | Shah et al. | |
| 4,774,099 A | 9/1988 | Feeney et al. | |
| 4,925,693 A | 5/1990 | Lauly | |
| 4,976,972 A | 12/1990 | Patel et al. | |
| 5,133,977 A | 7/1992 | Patel | |
| 5,252,136 A | 10/1993 | Desforges et al. | |
| 5,266,335 A | 11/1993 | Cherukuri et al. | |
| 5,314,810 A | 5/1994 | Kono et al. | |
| 5,411,730 A | 5/1995 | Kirpotin et al. | |
| 5,492,814 A | 2/1996 | Weissleder | |
| 5,709,896 A | 1/1998 | Hartigan et al. | |
| 6,123,926 A | 9/2000 | Parikh et al. | |
| 6,248,378 B1 | 6/2001 | Ganan-Calvo | |
| 6,548,264 B1 | 4/2003 | Tan et al. | |
| 6,703,057 B2 | 3/2004 | Duffett | |
| 6,777,397 B2 | 8/2004 | Zehner et al. | |
| 7,544,379 B2 | 6/2009 | Kawamura et al. | |
| 7,842,324 B2 | 11/2010 | Tachdjian et al. | |
| 8,911,806 B2 | 12/2014 | Baniel | |
| 8,962,058 B2 | 2/2015 | Prakash et al. | |
| 9,023,418 B2 | 5/2015 | Baniel | |
| 9,028,906 B2 | 5/2015 | Baniel | |
| 2001/0004869 A1 | 6/2001 | Cantiani et al. | |
| 2003/0014014 A1 | 1/2003 | Nitzan | |
| 2003/0039617 A1 | 2/2003 | White et al. | |
| 2004/0068224 A1 | 4/2004 | Couvillon, Jr. et al. | |
| 2004/0161498 A1 | 8/2004 | Ripoll et al. | |
| 2005/0130240 A1 | 6/2005 | Lin et al. | |
| 2005/0244568 A1 | 11/2005 | Gokhan | |
| 2006/0024335 A1 | 2/2006 | Roger | |
| 2006/0073255 A1 | 4/2006 | Catani et al. | |
| 2006/0102455 A1 | 5/2006 | Chiang et al. | |
| 2007/0116832 A1 | 5/2007 | Prakash et al. | |
| 2008/0193531 A1 | 8/2008 | Hermelin et al. | |
| 2008/0292765 A1 | 11/2008 | Prakash et al. | |
| 2009/0053378 A1 | 2/2009 | Prakash et al. | |
| 2009/0297670 A1 | 12/2009 | Baniel | |
| 2010/0129516 A1 | 5/2010 | Siegel | |

(Continued)

FOREIGN PATENT DOCUMENTS

AU  2012202679 B2  3/2014
EP  1447074 A2  8/2004

(Continued)

OTHER PUBLICATIONS

"International search report and written opinion dated Nov. 30, 2015 for PCT/IB2015/001153.".
Co-pending U.S. Appl. No. 14/677,715, filed Apr. 2, 2015.
Co-pending U.S. Appl. No. 14/440,975, filed May 6, 2015.
Lionnet, et al. Aspects of the Effects of Silica During Cane Sugar Processing. Proc S Afr Sug Technol Ass. vol. 78. 2004, 55-64.
Madho, et al. Silica in low grade refinery sugar Proc S Afr Sug Technol Ass. vol. 84. 2011, 516-527.
U.S. Appl. No. 14/629,272, filed Feb. 23, 2015, Baniel.
Al-Ghouti, et al. New adsorbents based on microemulsion modified diatomite and activated carbon for removing organic and inorganic pollutants from waste lubricants. Chemical Engineering Journal vol. 173, Issue 1 Sep. 2011, 115-128.

(Continued)

Primary Examiner — Jyoti Chawla
(74) Attorney, Agent, or Firm — Wilson Sonsini Goodrich & Rosati

(57) ABSTRACT

The invention provides a sweetener composition comprising a core nano particle in association with a sweetener carbohydrate 9 Claims, No Drawings

(56) References Cited

U.S. PATENT DOCUMENTS

| | | |
|---|---|---|
| 2011/0027355 A1 | 2/2011 | Lefevre et al. |
| 2011/0027444 A1 | 2/2011 | Gelov |
| 2011/0052755 A1 | 3/2011 | Fiorenza et al. |
| 2011/0059218 A1 | 3/2011 | Corliss et al. |
| 2012/0088025 A1 | 4/2012 | Baniel et al. |
| 2013/0273165 A1 | 10/2013 | Buchner |
| 2014/0010939 A1 | 1/2014 | Krohn et al. |
| 2014/0271747 A1 | 9/2014 | Woodyer et al. |
| 2015/0047630 A1 | 2/2015 | Baniel |
| 2015/0189904 A1 | 7/2015 | Prakash et al. |
| 2015/0275319 A1 | 10/2015 | Baniel |
| 2015/0289550 A1 | 10/2015 | Baniel et al. |
| 2016/0331012 A1 | 11/2016 | Baniel et al. |

FOREIGN PATENT DOCUMENTS

| | | |
|---|---|---|
| GB | 2025227 A | 1/1980 |
| IL | 180687 A | 4/1928 |
| IL | 169678 A | 11/2010 |
| IL | 180687 A | 4/2011 |
| JP | 4364122 A | 12/1992 |
| JP | 2001352936 A | 12/2001 |
| WO | WO 99/20127 A1 | 4/1999 |
| WO | WO 01/13740 A1 | 3/2001 |
| WO | WO 2004/098555 A1 | 11/2004 |
| WO | WO 2005/084457 A1 | 9/2005 |
| WO | WO 2006/015880 A1 | 2/2006 |
| WO | WO 2006/062089 A1 | 6/2006 |
| WO | WO 2007/007310 A1 | 1/2007 |
| WO | WO 2007/061810 A2 | 5/2007 |
| WO | WO-2007061757 A1 | 5/2007 |
| WO | WO-2007061858 A1 | 5/2007 |
| WO | WO-2007061900 A1 | 5/2007 |
| WO | WO-2007061912 A2 | 5/2007 |
| WO | WO-2007081442 A2 | 7/2007 |
| WO | WO-2008042417 A1 | 4/2008 |
| WO | WO 2009/006208 A2 | 1/2009 |
| WO | WO 2009/087215 A2 | 7/2009 |
| WO | WO-2009151072 A1 | 12/2009 |
| WO | WO 2010/025158 A1 | 3/2010 |
| WO | WO-2013045318 A1 | 4/2013 |
| WO | WO-2013082019 A1 | 6/2013 |
| WO | WO-2015015210 A1 | 2/2015 |
| WO | WO-2015150915 A2 | 10/2015 |
| WO | WO-2015159156 A2 | 10/2015 |

OTHER PUBLICATIONS

Fennema, Food Chemistry Third Edition 1996, Marcel Drekker Publication, Pertinent p. 193.
Graneinetti Laboratory (undated) http://www.grandinetti.org/Teaching/Chem121/Lectures/VSEPR.
Handbuch Subungsmittel: Eigenschaften and Anwendung. pp. 162-165. G.W. von Rymon Lipinski and H. Hamburg, Germany (1990). ISBN: 3-925673-77-6 (in German).
International search report and written opinion dated Apr. 4, 2014 for PCT Application No. IL2013/050851.
International search report and written opinion dated Jul. 20, 2006 for PCT Application No. IL2006/00573.
Kelly, et al. Phase Equilibria in the System Sucrose-Glucose-Fructose. J. appl. Chem. May 4, 1967. 17.5: 125-126.
Middle School Chemistry (undated) http://www.middleschoolchemistry.com/multimedia/chapter4/lesson6.
Notice of Allowance dated Jan. 2, 0215 for U.S. Appl. No. 13/250,088.
Notice of allowance dated Feb. 13, 2015 for U.S. Appl. No. 14/511,046.
Notice of allowance dated Oct. 6, 2014 for U.S. Appl. No. 11/995,464.
Office action dated Jan. 7, 2013 for U.S. Appl. No. 13/250,088.
Office action dated Jan. 10, 2013 for U.S. Appl. No. 11/995,464.
Office action dated Jan. 10, 2014 for U.S. Appl. No. 11/995,464.
Office action dated Apr. 18, 2012 for U.S. Appl. No. 11/995,464.
Office action dated May 30, 2013 for U.S. Appl. No. 13/250,088.
Office action dated Jul. 30, 2014 for U.S. Appl. No. 13/250,088.
Office action dated Aug. 15, 2011 for U.S. Appl. No. 11/995,464.
Office action dated Sep. 10, 2014 for U.S. Appl. No. 13/250,088.
Pending claims dated May 15, 2014 for U.S. Appl. No. 13/250,088.
Pending claims dated Aug. 28, 2014 for U.S. Appl. No. 13/250,088.
Smith, Jim; Hong-Shum, Lily (2003). Food Additives Data Book. (pp. 704-707). Blackwell Publishing. Online version available at: http://www.knovel.com/web/portal/browse/display?_EXT_KNOVEL_DISPLAY_book id=1381&VerticalID=0.
The surface chemistry of amorphous silica. Zhuravlev model L.T. Zhuravlev Institute of Physical Chemistry, Russian Academy of Sciences, Leninsky Prospect 31, Moscow 117915, Russia Feb. 2000 Elsevier, 38 pages.
Co-pending U.S. Appl. No. 15/045,145, filed Feb. 16, 2016.
International search report and written opinion dated Jan. 7, 2016 for PCT Application No. PCT-IB15-00773.
Office action dated Jan. 22, 2016 for U.S. Appl. No. 14/629,272.
Office action dated Mar. 28, 2016 for U.S. Appl. No. 14/440,975.
Office action dated Dec. 29, 2016 for U.S. Appl. No. 14/629,272.

SWEETENER COMPOSITIONS

This application is a continuation application of U.S. Application Ser. No. 11/995,464, filed on May 26, 2009, which is a National Phase Entry of International Application No. PCT/IL06/00573, filed on May 16, 2006, which claims priority from Israeli Patent Application Ser. No. 169,678, filed on Jul. 14, 2005, each of which is hereby incorporated by reference in its entirety.

The present invention relates to sweetener compositions. More particularly, the present invention relates to carbohydrate sweetener compositions having a higher sweetening power and a lower caloric content per weight than that of the carbohydrate component thereof, and to methods for the preparation thereof.

Sucrose, glucose, fructose and other sweet mono-saccharides and di-saccharides are fully metabolized when consumed in food. Thus, for each natural carbohydrate sweetener the provision of sweetness correlates with the provision of calories in a rigidly fixed proportion. The present invention provides for the manipulation of this proportion so that a desired sweetness may correlate with lower calorie values. This is achieved through the presentation of the carbohydrate sweetener in the form of a composition belonging to a class of compositions described below. Differently put, the perception of sweetness of a carbohydrate sweetener is retained while reducing the caloric value thereof by virtue of its being provided in a composition as described hereinafter.

More particularly, according to the present invention, there is now provided a sweetener composition comprising a core nano-particle in combination with a sweetener carbohydrate coating.

In preferred embodiments of the present invention, said nano-particles are of a size of between about 3 nm and 100 nm.

In especially preferred embodiments of the present invention, said nano-particles are of a size of between about 5 nm and 50 nm.

Preferably said nano-particles comprise exposed oxygen molecules along the surfaces thereof.

In especially preferred embodiment of the present invention, said nano-particles are dispersible in water and preferably, are substantially water-insoluble.

Since it is intended that the sweetener compositions in at least some of their application be incorporated in food products, preferably said nano-particles are food compatible.

In preferred embodiments of the present invention, said nano-particle cores are formed of inorganic nano-particles.

In especially preferred embodiment of the present invention, said nano-particle cores are formed of nano-silicas.

In these preferred embodiments, said nano-silicas carry on their surface —OH groups and Si—O—Si chains, and the oxygen components thereof are linked to carbohydrate groups which adhere thereto.

In other preferred embodiments of the present invention, said nano-particle cores are formed of organic nano-particles of poly-carbohydrates and derivatives thereof of limited water solubility, i.e., that are substantially insoluble below 50° C.

Thus in some preferred embodiments said nano-particle cores are formed of low solubility starches.

In other preferred embodiments said nano-particle cores are formed of nano-cellulose and nano-particles of cellulose derivatives such as ethoxycellulose and cellulose acetate.

In these preferred embodiments, said nano-cellulose carries on its surface —OH groups and C—O—C chains, and the oxygen components thereof are associated with said carbohydrate groups which adhere thereto.

As will be realized, the compositions of carbohydrates mentioned above consist of discrete nano-particulates exposing on their surface molecules of one or several carbohydrates. Each nano-particulate is formed of a core nano-particle closely associated with a sweetener carbohydrate coating.

Nano-particles that serve in the implementation of this invention preferably satisfy a number of conditions, including the following:

a) said particles are preferably between 3 nm to a 100 nm in size, most preferably 5 nm to 50 nm, wherein the term "size" as used herein is understood to denote the maximal distance between two points on the nano-particle;

b) said particles contain as part of their molecular constitution, oxygen that is exposed on the surface of the nano-particle;

c) said particles are dispersible but not soluble in water;

d) said particles are compatible with food.

Illustrative examples of the foregoing are given below. They can serve as an easy to follow guide by any competent chemist or food engineer.

Nano-Silica

Nano-silicas, generally made by precipitation processes in an aqueous phase, may be considered to be condensation products of silicic acid $Si(OH)_4$. They carry on their surface virtually the bulk of the —OH groups that did not take part in the condensation that forms the Si—O—Si chains that define the nano-particle. These hydroxyls interact strongly with water by virtue of hydrogen bonding and other intermolecular forces—an extensively studied fundamental phenomenon. The oxygen of Si—O—Si chains that is exposed on the surface also interacts with water, though to a lesser extent. These interactions with water are replaced (as explained in detail further below) by interactions with carbohydrates to form the particulate sweet composites claimed by the invention. Silica liberated on ingestion of such composites is not absorbed into the human body and thus is inherently harmless. In fact, as is known, fine silicas serve in industrial food production, for example as consistency modulators.

Nano-Cellulose

Cellulose $(C_6H_{10}O_5)_n$ is a polymer formed in plants by condensation of glucose. Cellulose is inherently linear. When reduced to nano size range the nano-particles have the shape of fibrils that are water insoluble and that expose on their surface hydroxyls attached to the $C_6$ carbon chain of the constituent glucose units as well as oxygen of the polymer forming C—O—C bonds. Carbohydrates can be made to associate with nano-cellulose to form compositions as described for nano-silica. Cellulose liberated on ingestion is similar to cellulose consumed in fruit and vegetables and thus obviously harmless and possibly beneficial.

A food technologist will consider a large variety of carbohydrate polymers as well as other organic polymers that are accepted food ingredients and that in nano sizes could serve as cores in constructing sweetener compositions. Similarly inorganic nano-particles other than silica that are innocuous or desired for a special or incidental purpose may be considered e.g. Barium Sulfate.

It was surprisingly found according to the present invention that if water is eliminated from an aqueous suspension of strongly hydrated nano-particles that contains carbohydrates in solution—provided that the elimination of water is very fast—association of nano-particles and carbohydrates takes place. The extent of the association varies with the particular technology adopted and specifics of materials, proportions etc. It can be assessed by the rate and extent of unassociated carbohydrates recovery when the dry raw composition formed in dehydration, in fine powder form as a rule, is redispersed in water. The most relevant assessment with respect to the present application is naturally the comparative evaluation of sweetness of the selected sweetener carbohydrate in free unassociated form and when in a composition. Such comparative evaluation tests are described in connection with the examples further below.

A speculative explanation of dehydration-mediated association would be that oxygenated groups on the nanoparticles and on the carbohydrates, transiently in a water-deprived state, interact in an energy lowering process similar to hydration as if carbohydrate, through its hydroxyls, replaces water. Naturally, some hydroxyls on the nano-core could interact with carbohydrate hydroxyls with water elimination. This however is irrelevant as all carbohydrate values are recovered on hydrolysis. The mode of preparation and the measure of sweetness of a specific composition defines it fully in the terms of the present invention.

All modes of very fast drying should be suitable for making composites with the proviso that temperatures entailing carbohydrates decomposition need be avoided. Flash evaporation is an effective mode which may be applied through several well known technologies. Thus for instance a suspension of nano-cellulose in aqueous sucrose can be effectively dried by spray-drying in nitrogen, or, spread as a thin-layer, dried under vacuum—conditions which prevent oxidation, while preferably controlled not to exceed 150° C. to prevent thermal degradation.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include effective embodiments will serve to illustrate the practice of this invention, it being understood that the particulars shown are by way of example and for purposes of instructive discussion of effective embodiments of the present invention only and are presented in the cause of providing what is believed to be the most useful and readily understood description of formulation procedures as well as of the principles and conceptual aspects of the invention.

In the examples below the materials that were used were:
1) sucrose purchased in a grocery described on the package as "pure granular sugar".
2) Commercial colloidal silica by DuPont "LudoxSK, Silica (as $SiO_2$) 25 wt %; Specific surface area, 230 $m^2/g$".

EXAMPLE 1

5.75 g of sucrose were dissolved in 10 g LudoxSK (which contained 7.5 g water and 2.5 g silica) heating gently to about 50° C. to decrease the viscosity and expedite dissolution. About 10 g of the resultant liquid material was spread evenly on a Petri dish of 7 cm diameter and put in an electric oven at 60° C. to dry overnight. The solution prior to drying was marked E1-1 and the crude composition according to the present invention which was obtained as dry powder was marked E1-2. This last was calculated and analytically confirmed to consist overall of 70% sucrose and 30% silica.

EXAMPLE 2

5.75 g of sucrose were dissolved in 10 g LudoxSK and 1 ml $H_2O$ added to decrease the viscosity. The liquid thus obtained could be dispersed from a nozzle under mechanical pressure as a fine fog. Experiments were performed in a bench-top spray drier consisting of a cylindrical vessel fed from the top with liquid by a nozzle accepting the liquid under regulated pressure and by vapor fed through a pipe concentric with the nozzle. Powder collection and vapor exit were provided for by conventional technology. Each experimental run was started by feeding, at atmospheric pressure, 170° C. superheated steam to raise the dryer chamber exit temperature to 110° C. at which point the spraying process was started and the temperature maintained throughout at 110° C./120° C. by adjusting steam flow. A preliminary test was done in drying a 40% sucrose solution under the conditions described above. The sucrose was recovered as a fine powder displaying a very light yellowish tinge but no change in taste compared to the input sugar could be perceived. Several runs of sucrose solution in LudoxSK were subsequently made whereby the corresponding composition, according to the present invention—marked E2-70% sucrose, 30% silica by calculation as well as by analysis (thus equal in components content to E1-2)—was obtained in consistent taste properties.

EXAMPLE 3

The dehydration in this case was effected in the same spray drier as in Example 2 applying a superheated vapor but differed from the former with respect to two operational parameters:

a. The superheated vapor consisted of 2-propanol at 160° C.;
b. The spray chamber was maintained at 90° C.

In a preliminary run with 40% sucrose solution perfect sucrose recovery was established. The crude composition (sucrose/silica 70/30) of this example was marked E3.

EXAMPLE 4

15.75 grs of LudoxSK/sucrose solution (as in Example 1) were introduced drop-wise by a pressure dispenser into 200 grs of liquid 2-propanol maintained at 120° C. in an autoclave. The pressure was then lowered by releasing vapor (which consisted of IPA and $H_2O$) whereby atmospheric pressure was established and the temperature came down to 83° C. (which is close to 82.5° C. the B.p. of 2-Propanol under atmospheric pressure). The contents of the autoclave were gently poured into a separatory funnel and the lower liquid slurry phase was separated and dried under vacuum. The nearly colorless powder obtained was marked E4. The upper liquid phase was analyzed and found to contain no $H_2O$ and only traces of sucrose.

EXAMPLE 5

Comparative Sweetness of Sucrose and Sucrose/Nano-Silica Compositions

Sweetness evaluations were made by the standard tasting panel procedure. The reference was a 7.5 sucrose solution in 100 water evaluated in comparison with a 10 (presumably derived from 7.5 sucrose) of each crude composition in 100 water. All compositions dispersed readily in water to form clear to slightly opalescent liquids. In cases of enhanced sweetness—comparisons were made with solutions with increased concentrations (marked C) expressed as sucrose per 100 water. An enhancement factor was defined by C/7.5. The results are tabulated below. The tasted solutions were re-tasted after 24 hrs. No significant changes in sweetness were observed.

| COMPOSITION | E1-1 | E1-2 | E2 | E3 | E4 |
|---|---|---|---|---|---|
| Description | Mixture prior to evaporation | 60° C. slow drying | Superheated steam spray drying | Solvent vapor spray drying | Superheated liquid solvent dehydration |
| Sucrose equivalent C | 7.5 | Possibly marginally over 7.5 | 15/16 | 14/18 | 18/20 |
| Enhancement factor | 1 | 1 | 2 | 2 | 2.5 |
| | nil enhancement | nil enhancement | twofold sweetness | twofold sweetness | 2.5-fold sweetness |
| Estimated % of unassociated sucrose if a tenfold enhancement is assigned to the composition according to the present invention | | | 92% | 92% | 85% |
| Estimated % of unassociated sucrose if a fivefold enhancement is assigned to the composition according to the present invention | | | 75% | 75% | 62% |

The tabulated comparative sweetness values of the sucrose/silica combination of the four examples make it clear that:

1. In aqueous solution the sucrose is unaffected by the presence of nano- silica before or after drying by a slow dehydration process as in Example 1.
2. Sweetness enhancement occurs when the drying is driven by a fast dehydration process such as vaporizing water under fast Heat Transfer at a considerable ΔT (Examples 2&3).
3. Sweetness enhancement does also occur through fast dehydration driven by solvent extraction of water at a temperature above the B.p. of the solvent as in Example 4.

The foregoing results can be simply explained by assuming crude compositions consist of sweetener carbohydrate recovered unchanged by drying and the composition according to the present invention in which carbohydrate is associated with a core nano material whereby sweetness enhancement occurs. Thus enhancement values observed with respect to any crude composition do not quantify the enhancement ultimately obtainable by a selected pair of a core nano and a carbohydrate sweetener as illustrated by arbitrarily assumed enhancements and the computed unassociated free carbohydrate content in the two bottom rows of the Table.

The practice of this invention advantageously involves only well known technologies and benefits from a very broad options space of materials and of processes for creating novel, purpose-built sweeteners economically. For any pair of nano-core/carbohydrate selected for development optimization can put into play several adjustable parameters: core/carbohydrate ratios that are fed to dehydration; types of dehydration; fractionations of crude composition obtained in each setting of foregoing options for enhancement levels of sweetness—all of which represent manipulations that will be obvious to a practicing engineer.

A speculative explanation of sweetness enhancement may be constructed of three assumptions:
a. Carbohydrates in a composition according to the present invention are likely to be perceived by sweet receptors.
b. The nano size of the particles of the composition according to the present invention makes for far lower diffusion rates that characterize non-associated carbohydrate molecules thereby prolonging sweetness perception.
c. The nano size of the particles of the composition according to the present invention makes also for its interacting concurrently with several proximate receptors resulting in the intensification of sweetness perception.

Assumption (a) is validated by experimental facts presented in this application. Assumptions (b) and (c) could well be elements of a single mechanism.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

The invention claimed is:

1. A dehydrated sweetener composition consisting essentially of a core particle and a sweetener carbohydrate; wherein said sweetener carbohydrate is in direct association with said core particle and forms a sweetener carbohydrate coating; wherein said core particle comprises exposed oxygen atoms along the surface thereof linked to said sweetener carbohydrate via hydrogen bonding thereby allowing release of said core particle upon ingestion; wherein said core particle is silica; and wherein said sweetener carbohydrate coating exhibits enhanced sweetness compared to a comparable amount of sweetener carbohydrate in free unassociated form.

2. A sweetener composition according to claim 1, wherein said core particle is of a size of between about 3 nm and 100 nm.

3. A sweetener composition according to claim 1, wherein said core particle is of a size of between about 5 nm and 50 nm.

4. A sweetener composition according to claim 1, wherein said core particle is dispersible in water.

5. A sweetener composition according to claim 1, wherein said core particle is substantially water-insoluble.

6. A sweetener composition according to claim 1, wherein said sweetener carbohydrate coating exhibits a sweetness at least two-fold greater when compared to a comparable amount of sweetener carbohydrate in free unassociated form.

7. A sweetener composition according to claim 1, wherein said sweetener carbohydrate is selected from the group consisting of mono-saccharides, di-saccharides and combinations thereof.

8. A sweetener composition according to claim 7, wherein said mono-saccharide is glucose or fructose.

9. A sweetener composition according to claim 7, wherein said di-saccharide is sucrose.

* * * * *